July 24, 1962　　　F. A. GAYNOR ET AL　　　3,045,956
DAMPING CONTROL
Filed May 9, 1955
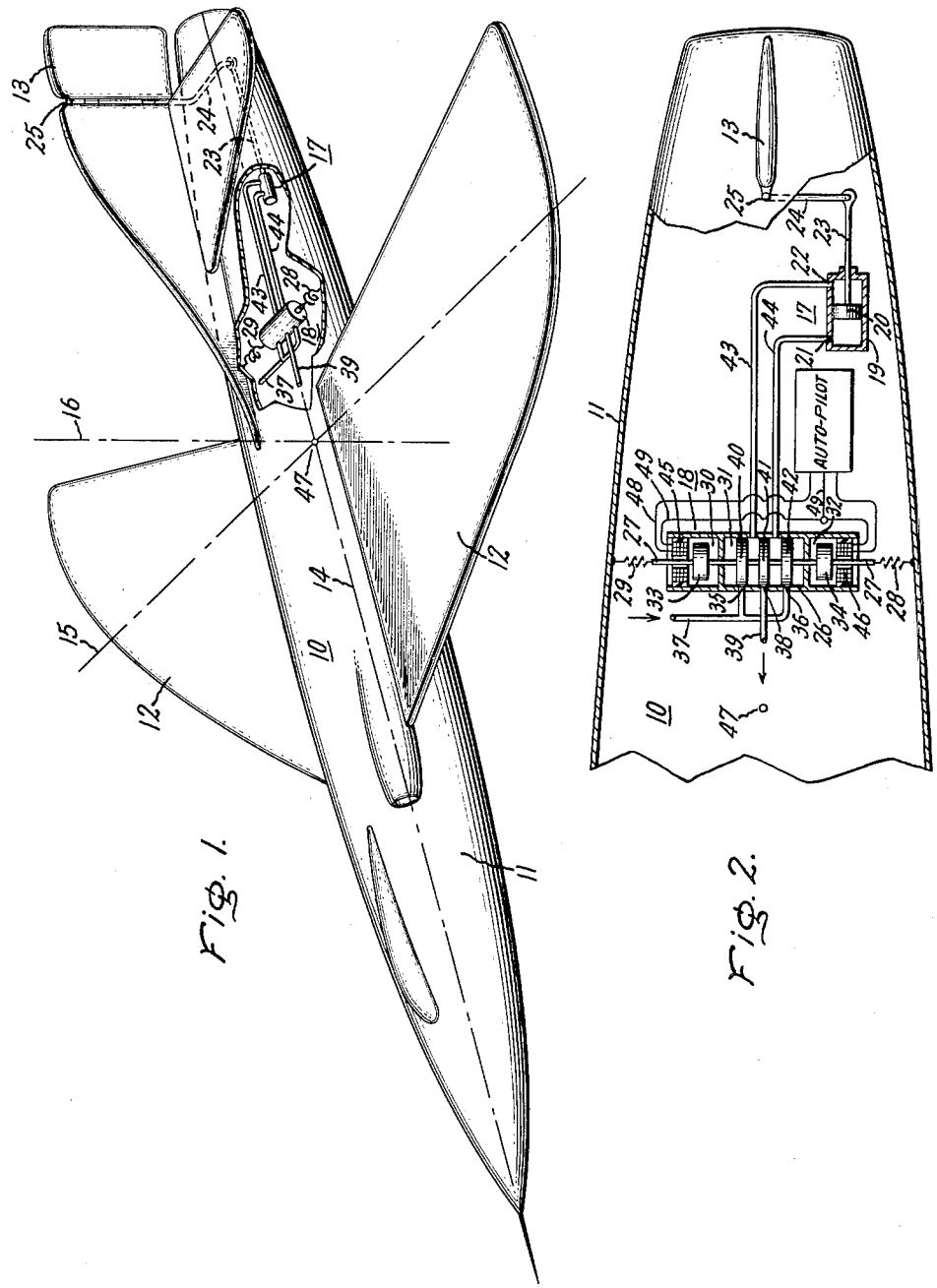
Inventors:
Joseph B. Gibbons,
Frank A. Gaynor,
Herbert W. Taylor,
by Claude W. Mott
Their Attorney.

3,045,956
DAMPING CONTROL
Frank A. Gaynor, Schenectady, Joseph B. Gibbons, West Albany, and Herbert W. Taylor, Scotia, N.Y., assignors to General Electric Company, a corporation of New York
Filed May 9, 1955, Ser. No. 506,822
3 Claims. (Cl. 244—78)

This invention generally relates to a stabilizer for dirigible craft and more particularly to systems for damping undesired transient movements of a high speed dirigible craft.

With the greater combinations of speed and maneuverability required of present day dirigible craft, such as high performance aircraft, has arisen the need for greater stability control of the craft since small weight unbalances, changes in air flow, and the like are all greatly magnified at high speeds to produce turning torques and aircraft oscillations. Similarly, to obtain higher speeds and maneuverability, aircraft designs have sacrificed to some extent stability also requiring external stability compensation or damping. However, contrasted with these greater requirements for external stability is the need for reducing the weight and complexity of the external damping system to enable a myriad of other automatic control apparatus to be employed for purposes of safety, speed and maneuverability; and at the same time providing such systems with sufficiently large torques for positioning the aircraft control surface against the tremendous forces of the wind resistance at high speed. Consequently, as a result, all of these naturally conflicting requirements have created serious problems and prior stabilizing systems have been unable to cope with and satisfy these problems and have fallen short of meeting the demands of increasing speed.

In accordance with the present invention, a new and improved damping system is proposed employing a hydraulically driven actuator for providing the large forces needed to position the control surface of the dirigible craft. Combined with this drive is provided a unique sensing and valve control mechanism for both rapidly responding to undesired transient motions and substantially instantaneously controlling the fluid flow to this actuator to make the necessary corrections in the control surface position. By providing this uniquely combined sensing and control mechanism in combination with this actuator, the additional weight heretofore supplied by separate sensing instruments and separate valve control elements are eliminated together with the weight of the usual devices employed for amplifying the signal from the separate sensing instruments.

It is accordingly one object of the present invention to provide a lightweight and dependable damping system for high speed and high performance dirigible craft.

A still further object of the invention is to provide a new and improved damping system for high speed aircraft that is highly sensitive to aircraft oscillations.

Other objects and many attendant advantages of this invention will be more readily comprehended to those skilled in the art upon a detailed consideration of the accompanying specification taken with the following drawings wherein:

FIG. 1 is a perspective view of an aircraft, partly in section, depicting one embodiment of the present invention;

FIG. 2 is a plan view of a portion of the aircraft of FIG. 1, partly in section, and depicting the inner structure of said embodiment of the invention.

Referring now to FIGS. 1 and 2 for detailed consideration of the present invention, numeral 10 denotes an aircraft having a rather streamlined body or fuselage portion 11, wings or fins 12 on either side thereof about its central portion, and at least one movable control surface 13 associated with the tail or rear portion and corresponding to a conventional rudder or the like. As well known in the art, such a dirigible craft is turnable about three perpendicular coordinate control axes; the roll axis 14, longitudinally passing through the central portion of the fuselage; the pitch or transverse axis 15 substantially transverse to the fuselage and in alignment with the outward projection of the wings; and the yaw or vertical axis 16 perpendicular to the fuselage and wings and vertical with respect to the earth during level flight. With this type of aircraft, movement of the control surface 13 provides a turning movement of the aircraft about its vertical or yaw axis 16 and, proper positioning of this movable control surface 13 is therefore employed to correct for aircraft oscillation about this yaw axis.

Basically in accordance with one preferred embodiment of the present invention, a hydraulic motor 17 is provided to rapidly and reversibly position this aircraft control surface 13 to correct for aircraft transient deviations. This motor is controlled by a unique acceleration responsive control valve, generally designated 18, that both senses the aircraft acceleration about one of its control axes (yaw axis 16, in this instance) and controls the flow of hydraulic fluid to the motor 17 to correct for these undesired accelerations.

Motor 17 may be a conventional reversibly operating hydraulic actuator comprised of a frame or cylinder 19 within which is concentrically positioned a reciprocably movable driving piston 20. Cylinder 19 is provided with two ports 21 and 22 for receiving and expelling hydraulic fluid, one on either end thereof and on opposite sides of the piston member 20. Being on opposite sides of the piston, hydraulic fluid under pressure entering either one of these ports drives the piston in the opposite direction. For example, fluid under pressure entering the left-hand port 21 operates against the lefthand side of the piston 20, driving the piston to the right and forcing the fluid then in the right-hand chamber of the cylinder 19 out of the right-hand port 22. Conversely hydraulic fluid under pressure entering the right-hand port 22 operates against the right-hand side of the piston 20, driving the piston to the left and forcing the fluid then in the left-hand chamber of the cylinder 19 out of the left-hand port 21.

Driven by piston 20 to position the aircraft control surface 13, is a piston rod 23 that projects through the cylinder 19 and is connected to the control surface 13 by a suitable linkage, preferably comprising a drive rod 24 connected to position the control surface 13 about its pivot axis 25 and being pivotally connected to piston rod 23, as shown. Thus, as the piston 20 of the actuator 17 is driven to the right or the left by the hydraulic fluid, the aircraft control surface 13 is pivoted clockwise or counterclockwise about its axis 25 in response to the magnitude and direction of the actuator movement.

The unique sensing and control valve 18 for controlling the hydraulic fluid to the actuator 17 is comprised of a housing or container 26, preferably cylindrical, as shown, affixed to the aircraft frame and having an elongate valve spool or shaft 27 coaxially positioned within the container 26 and having its opposite ends projecting through openings in the container ends and fastened to the aircraft frame by springs 28 and 29. Valve spool or shaft 27, therefore, may be reciprocally positioned along the longitudinal axis of the valve container 26, but is normally centered within the container by the oppositely acting springs 28 and 29.

Valve housing 26 is preferably divided into three chambers, an upper chamber 30, a central chamber 31, and a lower chamber 32. Within the upper and lower chambers 30 and 32, respectively, and supported by the valve spool 27 are two identical mass elements 33 and 34, respectively, each being balanced about the spool 27 by having their weights distributed symmetrically about the spool. With this arrangement, the valve spool 27 and weights 33 and 34 act as the mass element of a spring restrained type of accelerometer wherein the displacement of the valve spool 27 referenced to the housing 26 is proportional to the acceleration of the aircraft along the spool axis and the direction of this displacement is proportional to the direction of the aircraft acceleration about the spool axis 27.

To employ these acceleration responsive elements directly to control the hydraulic fluid to the motor 17, the central chamber 31 within housing 26 is employed as a differential fluid-tight valve using the movable valve spool 27 as the valve stem to actuate this valve. Referring to FIG. 2, this central chamber 31 is provided with two inlet ports 35 and 36 for receiving fluid under pressure over an inlet line 37 and one outlet port 38 for venting this fluid over an outlet line 39. When the valve spool or stem 27 is in its normal centered position within the housing 26 (in the absence of acceleration), three spaced piston shaped valve members 40, 41, and 42 supported by stem or shaft 27 within the chamber are seated against these ports and prevent the entry or escape of fluid to the chamber. However, if the spool 27 is displaced upwardly or downwardly with respect to the chamber 31, fluid under pressure enters either the upper port 35 or lower port 36 and passes through the chamber 31 and on into one or the other of the hydraulic lines 43 or 44 leading to the hydraulic motor 17, driving the piston 20 to position the control surface 13. For example, if the spool 27 moves upwardly with respect to the chamber 31, the upper valve member 40 uncovers the upper inlet port 35 permitting hydraulic fluid under pressure to pass downwardly over line 37 and through the valve chamber 31 to enter line 43, thereby entering the right-hand section of the hydraulic motor 17. As this fluid enters the right-hand section of actuator 17, it drives piston 20 to the left forcing fluid outwardly from actuator port 21 and outwardly over hydraulic line 44 to re-enter the lower port 44 on the right-hand side of the valve chamber 31. Since the central valve piston member 41 is also moved upwardly by movement of the valve stem, the outlet port 38 of the valve is uncovered and this returned fluid may then pass through the valve chamber and out over the exhaust line 39.

By following the above procedure it is observed that as the valve stem 27 moves downwardly with respect to the valve housing 26, the hydraulic fluid under pressure is directed through the valve to the left-hand side of the actuator 17 driving the piston 20 to the right and forcing the returned fluid out of the right-hand port 22 of the actuator backwardly through the valve chamber 31 and outwardly over exhaust line 39.

Thus, it is observed that the valve spool 27 along with its associated weight members 33 and 34 and springs 28 and 29 are uniquely arranged to reversibly position the piston valve members 40, 41, and 42 of a differential hydraulic valve to directly control the flow of hydraulic fluid to the hydraulic actuator 17, thereby directly positioning the control surface 13 in response to transient accelerations of the aircraft to correct for these accelerations.

By properly choosing the weights of the masses 33 and 34, as well as the weight of the valve spool 27 and valve pistons 40, 41, and 42; and by properly choosing the spring characteristics of the centering springs 28 and 29, variations in sensitivity and frequency responsive to accelerations may be obtained. Similarly, if it is desired to adjust, displace or "trim" the central position of the valve spool 27, this may be readily accomplished by providing solenoid type magnets 45 and 46 on opposite ends of the housing 26 to displace or attract the mass elements 33 and 34 from their central positions normally determined by the spring members 28 and 29. As shown, these solenoids 45 and 46 are preferably oriented to produce axial forces on the mass elements along the axis of the valve spool; and by varying the current to these solenoids, the valve may be biased, as desired, or centrally adjusted to compensate for spring unbalance.

If it is desired to employ this sensing valve mechanism and actuator with an automatic pilot mechanism for controlling maneuvers of the aircraft and stabilizing the aircraft attitude or altitude, this may be readily performed by means of the present invention by connecting the differential electrical output lines of an automatic pilot mechanism to energize the solenoids 45 and 46. Thus, for example, if it is desired to deflect the aircraft control surface 13 in a clockwise direction by means of an automatic pilot, the upper solenoid 45 may be energized by electrical signals from the automatic pilot (see FIGURE 2 of the drawing), over lines 48 and 49 to attract the upper mass 33 in an upward direction, thereby permitting hydraulic fluid under pressure to enter the right-hand inlet port 22 of motor 17 and displace the motor piston 20 to the left.

Referring again to FIG. 1, it is noted that in the embodiment of the invention illustrated, the housing 26 and valve spool 27 are positioned transversely to the craft longitudinal axis 14, and, therefore, respond to lateral accelerations of the aircraft, preventing side slip or skid. In addition, if the sensing valve mechanism 18 is displaced from the aircraft center-of-gravity 47, it also determines accelerations of the aircraft about its vertical axis 16 passing through the aircraft center-of-gravity 47. In this latter instance, this system also operates as an angular accelerometer to correct for aircraft yaw; and by progressively increasing the displacement of the sensing valve 18 from the aircraft center-of-gravity 47, the measured acceleration about this yaw axis progressively increases.

Thus, the present invention provides a lightweight directly acting control system for both detecting or sensing undesired transient accelerations and directly controlling the flow of hydraulic fluid under pressure to an actuator for correcting such accelerations. Although but one preferred embodiment of this invention has been disclosed for controlling accelerations about the yaw and transverse axis of an aircraft, it is obvious that this invention may be employed for controlling the aircraft about any one or all three of its axes and that it may be similarly applied to other dirigible craft. Furthermore, it is obvious to those skilled in the art that many changes may be readily made without departing from the spirit and scope of this invention, and, therefore, this invention is to be considered as being limited only in accordance with the claims appended hereto.

What we claim as new and desire to secure by Letters Patent of the United States is:

1. In an acceleration control system, a hydraulically operated actuator having two ports and a member reversibly movable in response to the direction of hydraulic flow through said ports, means responding to acceleration and the direction of acceleration for selectively controlling the direction of fluid flow through said ports, said means including an inertia-actuated element, spring restraining means for resisting movement of said element in opposite directions, means on said element for directly controlling the magnitude and direction of fluid flow through said ports in response to the direction of movement of said element, and electrical means for variably displacing said element in opposite directions.

2. In an acceleration sensitive differential control valve for selectively controlling the rate and direction of fluid flow through two ports in response to the magnitude and direction of an acceleration, an inertia-actuated element, spring-restraining means for resisting movement of said element in opposite directions, and means on said element for directly and selectively channeling fluid flow into and out of different ones of said two ports in response to the direction of movement of said element and at a rate related to the extent of movement of said element, and an electrical means for reversedly displacing said element to varying positions.

3. In a device of the class described, a shaft, an inertia actuated mass supported by the said shaft, spring-restraining means for resisting movement of said shaft in opposite directions, a plurality of valve members supported by said shaft, a housing having a plurality of inlet ports, an outlet port, and at least two control ports; said valve members normally sealing said inlet and outlet ports from said control ports and selectively connecting one of said inlet ports to one of said control ports and said outlet port to the other of said control ports in response to movement of said shaft in one direction and connecting another inlet port to the other of said control ports and said outlet port to the other of said control ports in response to movement of said shaft in the opposite direction, and an electrical means for reversibly displacing said shaft.

References Cited in the file of this patent

UNITED STATES PATENTS

| | | |
|---|---|---|
| 1,154,396 | Hayot | Sept. 21, 1915 |
| 2,222,886 | Voigt | Nov. 26, 1940 |
| 2,396,321 | Goddard | Mar. 12, 1946 |
| 2,488,286 | Glenny | Nov. 15, 1949 |
| 2,615,658 | Young | Oct. 28, 1952 |

FOREIGN PATENTS

| | | |
|---|---|---|
| 221,794 | Switzerland | Sept. 16, 1942 |
| 712,128 | Germany | Oct. 13, 1941 |